United States Patent
Garcia Castro et al.

(10) Patent No.: US 10,208,192 B2
(45) Date of Patent: Feb. 19, 2019

(54) COPOLYMERS COMPRISING ETHYLENE, VINYL ESTERS AND ESTERS OF (METH)ACRYLIC ACID, THEIR FORMULATIONS AND USE AS POUR POINT DEPRESSANT, WAX INHIBITOR AND FLOW ENHANCER FOR CRUDE OILS

(71) Applicant: BASF SE, Ludwigshafen (DE)

(72) Inventors: Ivette Garcia Castro, Ludwigshafen (DE); Stefan Frenzel, Eislingen (DE); Maria Heuken, Neustadt (DE); Jennifer Jackson, Mannheim (DE)

(73) Assignee: BASF SE, Ludwigshafen Am Rhein (DE)

( * ) Notice: Subject to any disclaimer, the term of this patent is extended or adjusted under 35 U.S.C. 154(b) by 152 days.

(21) Appl. No.: 15/119,144

(22) PCT Filed: Feb. 16, 2015

(86) PCT No.: PCT/EP2015/053212
§ 371 (c)(1),
(2) Date: Aug. 16, 2016

(87) PCT Pub. No.: WO2015/124529
PCT Pub. Date: Aug. 27, 2015

(65) Prior Publication Data
US 2017/0009067 A1  Jan. 12, 2017

(30) Foreign Application Priority Data
Feb. 18, 2014 (EP) ..................... 14155611

(51) Int. Cl.
| | | |
|---|---|---|
| *C08L 23/08* | (2006.01) | |
| *C10L 1/19* | (2006.01) | |
| *C08F 210/02* | (2006.01) | |
| *C10L 10/16* | (2006.01) | |
| *E21B 37/06* | (2006.01) | |
| *F17D 1/17* | (2006.01) | |
| *C10L 1/197* | (2006.01) | |
| *C09K 8/524* | (2006.01) | |
| *C09K 8/588* | (2006.01) | |

(52) U.S. Cl.
CPC ........ *C08L 23/0869* (2013.01); *C08F 210/02* (2013.01); *C08L 23/0853* (2013.01); *C09K 8/524* (2013.01); *C09K 8/588* (2013.01); *C10L 1/1973* (2013.01); *C10L 10/16* (2013.01); *E21B 37/06* (2013.01); *F17D 1/17* (2013.01); *C08L 2201/56* (2013.01); *C10L 2270/10* (2013.01)

(58) Field of Classification Search
CPC ............ C08L 23/1869; C08L 23/0853; C08L 2201/56; C10L 1/1973; C10L 10/16; C10L 2270/10; C08F 210/02; C09K 8/524; C09K 8/588; E21B 37/06
USPC ........................................................ 524/562
See application file for complete search history.

(56) References Cited

U.S. PATENT DOCUMENTS

| | | | |
|---|---|---|---|
| 3,642,459 A | 2/1972 | Ilnyckyj | |
| 4,156,434 A | 5/1979 | Parker et al. | |
| 4,608,411 A * | 8/1986 | Meunier | C08F 255/02 524/531 |
| 5,254,652 A | 10/1993 | Reimann et al. | |
| 8,338,344 B2 * | 12/2012 | Maehling | C08F 210/02 44/388 |
| 8,642,521 B2 | 2/2014 | Ahlers et al. | |
| 2007/0094920 A1 | 5/2007 | Ahlers et al. | |
| 2008/0178523 A1 * | 7/2008 | Ahlers | C10L 1/1973 44/388 |
| 2010/0048439 A1 * | 2/2010 | Maehling | C08F 210/02 508/469 |
| 2010/0281762 A1 * | 11/2010 | Chevrot | C10L 1/143 44/393 |
| 2012/0102825 A1 * | 5/2012 | Chevrot | C10L 1/143 44/307 |
| 2014/0165457 A1 * | 6/2014 | Castro | C10L 10/16 44/393 |
| 2014/0166287 A1 * | 6/2014 | Faul | E21B 43/16 166/305.1 |

FOREIGN PATENT DOCUMENTS

| | | |
|---|---|---|
| CA | 2055418 A1 | 5/1992 |
| DE | 19 02 925 A1 | 11/1969 |
| DE | 20 47 448 A1 | 3/1972 |
| EP | 003 489 A1 | 8/1979 |
| EP | 486 836 A1 | 5/1992 |
| EP | 493 769 A1 | 7/1992 |
| EP | 1923454 A1 | 5/2008 |

(Continued)

OTHER PUBLICATIONS

International Preliminary Report on Patentability for PCT/2015/053212 dated Sep. 7, 2016.

(Continued)

*Primary Examiner* — Michael Bernshteyn
(74) *Attorney, Agent, or Firm* — Drinker Biddle & Reath LLP

(57) ABSTRACT

Copolymers comprising ethylene, vinyl esters, in particular vinyl acetate and esters of (meth)acrylic acid, selected from esters comprising branched alkyl, cyclic alkyl or optionally alkyl substituted aryl moieties and having a weight average molecular weight of 35,000 g/mol to 150,000 g/mol, formulations of such copolymers in organic solvents and their use as pour point depressant, wax inhibitor and flow enhancer for crude oils.

21 Claims, No Drawings

(56) References Cited

FOREIGN PATENT DOCUMENTS

| | | |
|---|---|---|
| GB | 900202 A | 7/1962 |
| GB | 1147904 A | 4/1969 |
| GB | 1403782 A | 8/1975 |
| JP | 2001303329 A | 10/2001 |
| WO | WO-96/07718 A1 | 3/1996 |
| WO | WO-96/17905 A1 | 6/1996 |
| WO | WO-2005/054314 A2 | 6/2005 |
| WO | WO-2006111326 A1 | 10/2006 |
| WO | WO-2009/106744 A2 | 9/2009 |
| WO | WO-2011001352 A1 | 1/2011 |

OTHER PUBLICATIONS

*Ullmann's Encyclopedia of Industrial Chemistry*, Fifth, Completely Revised Edition, vol. A28: Water to Zirconium and Zirconium Compounds, Section 6.1.1 Polyethelene Waxes by High-Pressure Polymerization, pp. 146-157 (1996).

International Search Report for PCT/EP2015/053212 dated Apr. 2, 2015.

\* cited by examiner

COPOLYMERS COMPRISING ETHYLENE, VINYL ESTERS AND ESTERS OF (METH)ACRYLIC ACID, THEIR FORMULATIONS AND USE AS POUR POINT DEPRESSANT, WAX INHIBITOR AND FLOW ENHANCER FOR CRUDE OILS

The present invention relates to copolymers comprising ethylene, vinyl esters, in particular vinyl acetate and esters of (meth)acrylic acid, selected from esters comprising branched alkyl, cyclic alkyl or optionally alkyl substituted aryl moieties and having a weight average molecular weight of 35,000 g/mol to 150,000 g/mol, formulations of such copolymers in organic solvents and their use as pour point depressant, wax inhibitor and flow enhancer for crude oils.

Underground mineral oil formations typically have relatively high temperatures. After the production of the crude oil to the surface, the crude oil produced therefore cools down to a greater or lesser degree according to the production temperature and the storage or transport conditions.

According to their origin, crude oils have different proportions of waxes, which consist essentially of long-chain n-paraffins. According to the type of crude oil, the proportion of such paraffins may typically be 1 to 30% by weight of the crude oil. When the temperature goes below a particular level in the course of cooling, the paraffins can crystallize, typically in the form of platelets. The precipitated paraffins considerably impair the flowability of the oil. The platelet-shaped n-paraffin crystals can form a kind of house-of-cards structure which encloses the crude oil, such that the crude oil ceases to flow, even though the predominant portion is still liquid. The lowest temperature at which a sample of an oil still just flows in the course of cooling is referred to as the "pour point". For the measurement of the pour point, standardized test methods are used. Precipitated paraffins can block filters, pumps, pipelines and other installations or be deposited in tanks, thus entailing a high level of cleaning.

The deposit temperature of oil deposits is generally above room temperature, for example 40° C. to 100° C. Crude oil is produced from such deposits while still warm, and it naturally cools more or less quickly to room temperature in the course of or after production, or else to lower temperatures under corresponding climatic conditions. Crude oils may have pour points above room temperature, so such that crude oils of this kind may solidify in the course of or after production.

It is known that the pour point of crude oils can be lowered by suitable additives. This can prevent paraffins from precipitating in the course of cooling of produced crude oil. Suitable additives firstly prevent the formation of said house-of-cards-like structures and thus lower the temperature at which the crude oil solidifies. In addition, additives can promote the formation of fine, well-crystallized, non-agglomerating paraffin crystals, such that undisrupted oil transport is ensured. Such additives are referred to as pour point depressants or flow improvers.

It is known in the art to use copolymers of ethylene and vinyl acetate as pour point depressant for improving cold flow properties of crude oil and mineral oil products such as disclosed for instance in GB 900,202 A, GB 1,147,904 A, GB 1,403,782 A and EP 003 489 A1.

However, the performance of ethylene-vinyl acetate copolymers alone often is not sufficient and the solubility of such polymers in hydrocarbons often is not sufficient. Therefore, a lot of attempts have been made in order to improve the performance of such ethylene-vinyl acetate copolymers, DE 20 47 448 A discloses additives for lowering viscosity in paraffin-based crude oils. The additives are mixtures of polyvinyl ethers and ethylene-vinyl acetate copolymers.

It is furthermore known to modify ethylene-vinyl acetate copolymers by copolymerizing by acrylates, in particular long-chain acrylates in the presence of ethylene-vinyl acetate copolymers thereby yielding graft polymers in which at least a part of the poly acrylate has been grafted onto the ethylene-vinyl acetate copolymer. Examples of that technique are disclosed in EP 486 836 A1 and U.S. Pat. No. 4,608,411.

However, the production of graft polymers needs an additional manufacturing step. It is desirable to avoid such an additional step.

It is furthermore known to use additional comonomers besides ethylene and vinyl acetate, in particular (meth)acrylates and vinyl esters different from vinyl acetate.

DE 19 02 925 A discloses copolymers of 40 % to 89 % by wt. of ethylene, 10 % to 40 % by wt. of vinyl esters of monocarboxylic acids having 2 to 4 carbon atoms, and 1 to 30% by wt. of $C_{10}$ to $C_{22}$ alkyl esters of (meth)acrylic acid or vinyl esters of monocarboxylic acids having 10 to 22 carbon atoms having a number average molecular weight of 1,000 to 50,000, preferably 1,500 to 5,000. DE 190 29 25 A furthermore discloses the use of such copolymers as pour point depressants for crude oil distillates.

U.S. Pat. No. 4,156,434 discloses a terpolymer of 60% to 89% by wt. ethylene, 8% to 25% by wt. vinyl acetate, and 3% to 15% by wt. of a linear or branched $C_{12}$ to $C_{22}$ alkyl ester of (meth)acrylic acid having a number average molecular weight of 12,000 to 37,000. The publication does not disclose any specific $C_{12}$ to $C_{22}$ alkyl esters used. U.S. Pat. No. 4,156,434 furthermore discloses the use of such terpolymers as pour point depressant for gas oils.

EP 493 769 A1 discloses terpolymers of 40% to 94% by wt. of ethylene, 5 to 35% of vinyl acetate and 1% to 25% of neononane carboxylic acid vinyl esters or neodecane carboxylic acid vinyl esters (i.e. branched $C_9$ or $C_{10}$ carboxylic acid vinyl esters) having a number average molecular weight of 500 to 5,000 g/mol and their use as additives for mineral oil distillates.

WO 96/07718 A1 discloses an oil composition comprising a terpolymer of ethylene and two different carboxylic acid vinyl esters, one of them being the vinyl ester of a $C_1$ to $C_5$ carboxylic acid and the other one being a branched $C_9$ to $C_{15}$ carboxylic acid.

WO 96/17905 A1 discloses an oil-soluble additive comprising a terpolymer of ethylene and vinyl esters $H_2C=CHOOR$ or acrylates $H_2C=CH-COOR$, wherein R is a $C_1$ to $C_4$ alkyl group and vinyl esters $H_2C=CHOOR'$ or acrylates $H_2C=CH-COOR'$ wherein R' is a tertiary alkyl group having 8 or more carbon atoms.

WO 2005/054314 A2 discloses the use of polymers comprising 60 to 98 mol % α-olefines, preferably ethylene, 1 to 20 mol % vinyl esters, preferably vinyl acetate and 1 to 20 mol % esters of α,β-unsaturated carboxylic acids, preferably $C_1$ to $C_{20}$ esters as additives for fuel oils and lubricants. The number average molecular weight is 1,000 to 20,000, preferably 1,500 to 5,000. The weight average molecular weight may be 1,000 to 30,000 and $M_w/M_n$ may be from 1,5 to 5. A copolymer of ethylene, vinyl acetate and 2-ethylhexyl acrylate is most preferred.

WO 2009/106744 A2 discloses the use of a terpolymer comprising 78% to 87% by mol ethylene, 12% to 18% by mol vinyl acetate and 1% to 4% by mol acrylates, preferably 2-ethylhexyl acrylate as additive for fuel oils. Preferably, the weight average molecular mass is 3,000 to 30,000.

The cited documents focus on the use of terpolymers of ethylene, vinyl acetate and further comonomers as additives for fuel oils, mineral oils and/or destillates of crude oil. It were desirable to use such class of polymers also as additives for crude oil, in particular as pour point depressant for crude oil, wax inhibitors for crude oil or rheology modifiers for crude oil.

However, there are different requirements to such additives for crude oil compared to additives fuel oils, mineral oils and/or destillates of crude oil which makes it difficult to use such known additives without modifications for crude oil.

Additives for crude oil are necessarily used at the production sites of crude oil. Such production sites also may be offshore platforms which furthermore may be located in cold regions, e.g. arctic regions. Pour point depressants are generally supplied as concentrated solutions and can be formulated for use in the desired manner by the users on site. The products supplied should be liquid in order to avoid melting on site, and the solutions should also remain stable over a long period and not have a tendency to phase separation, such that they can be stored with great simplicity.

It was therefore an object of the present invention to provide a copolymer comprising ethylene, a vinyl ester, and a (meth)acrylate which can be easily provided as formulations in non-polar solvents having a sufficient stability during transport, storage and use even in cold environments and which have a good performance as pour point depressant, wax inhibitors and rheology modifiers for crude oil.

Accordingly, copolymer (A) at least comprising ethylene, a vinyl ester, and a (meth)acrylate have been found wherein the copolymer (A) at least comprises (M1) 83.5 mol % to 96.5 mol % of ethylene,
(M2) 3 mol % to 11.5 mol % of at least one vinyl ester of the general formula $H_2C=CH-O-(O)C-R^1$ (I) where $R^1$ is H or a $C_1$- to $C_4$ alkyl moiety, and
(M3) 0.5 mol % to 5 mol % of a (meth)acrylate of the general formula $H_2C=C(R^2)-COOR^3$ wherein $R^2$ is H or methyl, and $R^3$ is selected from the group of
$R^{3a}$: branched alkyl moieties having 4 to 18 carbon atoms,
$R^{3b}$: cyclic alkyl moieties having 5 to 12 carbon atoms, and
$R^{3c}$: optionally alkyl substituted aryl moieties having 6 to 12 carbon atoms, and wherein the weight average molecular weight M, of the copolymer (A) is 35,000 g/mol to 150,000 g/mol.

In a second aspect of the invention, a polymer composition (X) has been found at least comprising
at least one copolymer (A) as defined above, and
at least one organic solvent (B),
wherein the concentration of the copolymer (A) is 5 to 25% by weight with respect to the sum of all components of the polymer composition (X).

In a third aspect of the invention it has been found to use the copolymers (A) as defined above as pour point depressants, wax inhibitors and rheology modifiers for crude oil.

Specific details of the invention are as follows:

Copolymer (A)

Copolymer (A) according to the invention comprises as monomers at least ethylene (monomer M1), a vinyl ester (monomer M2), and a (meth)acrylate (monomer M3).

Copolymer (A) comprises 83.5 mol % to 96.5 mol % of ethylene (monomer M1), preferably 85 mol % to 95 mol %, more preferably 86 mol % to 93 mol %, and most preferably 88 mol % to 92 mol %.

Copolymer (A) furthermore comprises 3 mol % to 11.5 mol % of at least one vinyl ester (monomer M2) of the general formula $H_2C=CH-O-(O)C-R^1$ (I) where $R^1$ is H or a $C_1$- to $C_4$ alkyl moiety. Preferably $R^1$ is methyl and/or ethyl and more preferably $R^1$ is methyl. Preferably, the amount of the vinyl ester(s) is 4 mol % to 10.5 mol %.

Copolymer (A) furthermore comprises 0.5 mol % to 5 mol % of at least one (meth)acrylate (monomer M3) of the general formula $H_2C=C(R^2)-COORS$ wherein $R^2$ is H or methyl, and $R^3$ is at least one group selected from the group of $R^{3a}$, $R^{3b}$, and $R^{3c}$. Preferably, the amount of (meth)acrylates is 0.5 mol % to 4 mol %.

The moieties $R^{3a}$ are branched alkyl moieties having 4 to 18 carbon atoms, preferably 5 to 11 carbon atoms and more preferably 8 to 10 carbon atoms. Examples of branched alkyl moieties $R^{3a}$ comprise 2-methylpropyl-, t-butyl-, 3-methylbutyl-, 2,2'-dimethylpropyl-, 2-ethylhexyl-, 2-propylheptyl-, i-nonyl-, i-decyl-, i-undecyl-, i-dodecyl-, and i-heptadecyl- moieties, preference being given to 2-ethylhexyl and 2-propylheptyl moieties. Most preferably, $R^{3a}$ is a 2-propylheptyl moiety.

The moieties $R^{3b}$ are cyclic alkyl moieties having 5 to 12 carbon atoms, preferably 6 to 10 carbon atoms. Cyclic alkyl moieties may be monocyclic or polycyclic, for example bicyclic. They may be furthermore substituted with linear and/or branched alkyl moieties. Examples of cyclic alkyl moieties $R^3b$ comprise cyclopentyl-, cyclohexyl-, 4-methylcyclohexyl-, cycloheptyl-, bicyclo[2.2.1]heptyl-, bicyclo[2.2.2]octyl- or 2-(1,7,7-trimethyl)bicycle[2.2.1]heptyl- moieties. Preferably, $R^{3b}$ is a cyclohexyl moiety.

The moieties $R^{3c}$ are optionally alkyl substituted aryl moieties having 6 to 12 carbon atoms. Examples comprise phenyl-, benzyl- or 2-phenyl ethyl- moieties.

Preferably, $R^3$ is selected from $R^{3a}$ and $R^{3b}$, more preferably, $R^3$ is $R^{3a}$.

Besides the monomers M1, M2, and M3 copolymer (A) may comprise further monomers M4. Suitable monomers M4 are ethylenically unsaturated monomers which are copolymerizable with the monomers M1; M2, and M3, Such further monomers M4 may be used to fine tune the properties of the polymer.

Examples of monomers M4 comprise olefins, in particular α-olefines other than ethylene, for example propene, 1-butene or isobutene, vinyl esters $H_2C=CH-O-(O)C-R^4$ (IV), wherein $R^4$ is a hydrocarbon moiety having more than 4 carbon atoms, in particular 5 to 20 carbon atoms, and (meth)acrylates $H_2C=C(R^2)-COOR^5(V)$, wherein $R^2$ has the meaning as defined above and $R^5$ is a moiety other than $R^3$, for example linear alkyl moieties having 1 to 22 carbon atoms, branched alkyl moieties having more than 12 carbon atoms, in particular 12 to 22 carbon atoms, and/or optionally alkyl substituted aryl moieties having more than 12 carbon atoms, in particular 12 to 22 carbon atoms.

The amount of such additional monomers M4 is from 0% to 12,5 mol %, preferably from 0 to 10 mol %, more preferably 0 to 5 mol %, and in the most preferred embodiment no additional monomers M4 are present.

The copolymers (A) according to the invention have a weight average molecular weight NA, of 35,000 g/mol to 150,000 g/mol, preferably 50,000 g/mol to 120,000 g/mol, and more preferably 60,000 g/mol to 110,000 g/mol, and for example 70,000 g/mol to 100,000 g/mol.

The polydispersity $M_w/M_n$ ($M_n$: number average molecular weight) may be from 2 to 9, preferably from 3 to 7.

In one embodiment of the invention, copolymer (A) comprises 87 mol % to 93 mol % ethylene, 4 mol % to 10 mol % of vinylacetate and 1 mol % to 4 mol % of 2-propylheptyl(meth)acrylate, More preferably, copolymer (A) consists of such monomers. In a preferred embodiment such a polymer may have a weight average molecular weight of 60,000 g/mol to 150,000 g/mol, preferably 60,000 g/mol to 120,000 g/mol, more preferably from 65,000 g/mol to 100,000 g/mol and for example from 70,000 g/mol to 90,000 g/mol. The polydispersity $M_w/M_n$ of such specific copolymers (A) may preferably be from 3 to 7.

In another embodiment of the invention, copolymer (A) comprises 87 mol % to 93 mol % ethylene, 4 mol % to 10 mol % of vinylacetate and 1 mol % to 4 mol % of 2-ethylhexyl(meth)acrylate. More preferably, copolymer (A) consists of such monomers.

In another embodiment of the invention, copolymer (A) comprises 87 mol % to 93 mol % ethylene, 4 mol % to 10 mol % of vinylacetate and 0.5 mol % to 4 mol % of cyclohexyl(meth)acrylate. More preferably, copolymer (A) consists of such monomers.

Manufacture of Copolymers (A)

The copolymers (A) according to the invention can be manufactured by radical polymerization under high-pressure conditions using suitable initiators for radical polymerization for example in stirred high-pressure autoclaves or in high-pressure tube reactors such as the methods described in WO 2005/054314 A2. Preparation of the copolymer (A) in stirred high-pressure autoclaves is preferred. Stirred high-pressure autoclaves are known per se and a description may be found in *Ullmann's Encyclopedia of Industrial Chemistry* 5$^{th}$ edition, keywords: waxes, Vol. A 28, p. 146 ff., Verlag Chemie Weinheirn, Basel, Cambridge, New York, Tokyo, 1996. They usually have a length/diameter ratio in the range from 5:1 to 30:1, preferably from 10:1 to 20:1. The high-pressure tube reactors which can also be employed are likewise described in said citation.

Suitable pressure conditions for the polymerization are from 1000 to 3000 bar, preferably from 1500 to 2500 bar. The reaction temperatures are, for example, in the range from 160° C. to 320° C., preferably in the range from 180 to 260'C.

Useful initiators for free-radical polymerization are customary free-radical initiators such as organic peroxides, oxygen or azo compounds. Also suitable are mixtures of a plurality of free-radical initiators are also useful. Suitable peroxides are disclosed in U.S. 2007/0094920 A1, paragraphs [0068], [0069], and [0070]. Particularly useful peroxides are di-tert-butyl peroxide, tert-butyl peroxypivalate, tert-butyl peroxyisononanoate, tert-amylperoxipivalate and dibenzoyl peroxide and mixtures thereof. An azo compound which may be mentioned by way of example is azobisisobutyronitrile ("AIBN"). Free-radical initiators are introduced in amounts customary for polymerizations.

Optionally, the polymerization can be carried out in the presence of one or more regulators (chain transfer agents) for controlling the molecular weight of the copolymers (A). Suitable regulators are disclosed in U.S. 2007/0094920 A1, paragraphs [0056] to [0065]. Particularly useful regulators are $H_2$, propene, butene, propion aldehyde, or methylethylketone.

The amount of the regulator used can be chosen by the skilled artisan according to his/her needs. In order to achieve the desired weight average molecular weight $M_w$ 30,000 g/mol to 150,000 g/mol it is frequently advisable to limit the amount of regulator to an amount of not more than 0.6% by wt. relating to the total amount of all comonomers used.

In one embodiment of the invention, the amount of regulator is 0 to 0.2% by wt. relating to the total amount of all comonomers used. In another embodiment of the invention no regulator is used.

In a preferred method, the inventive copolymers (A) are prepared in such a manner that ethylene is compressed by a gas compressor to approximately 250 bar and in parallel a mixture of the comonomers M2, M3, and optionally M4 and optionally at least one regulator are also compressed separately by a pump to approximately 250 bar.

Both, ethylene and the comonomer mixture are mixed at a pressure of approximately 250 bar and thereafter the mixture is compressed by a hypercompressor to a pressure of about 1,700 to 2,200 bar. The monomers and the regulator are now dissolved in supercritical ethylene, The mixture having a temperature from 20° C. to 50° C., preferably 25° C. to 35° C. is passed, preferably continuously, through a stirred autoclave which is maintained at a pressure of 1,500 to 2,500 bar, for example 1,600 to 2,200 bar. The initiator which generally is dissolved in a suitable solvent, for example isododecane or methylethylketone is also fed—preferably continuously—into the stirred autoclave, which the comonomers are passing through thus maintaining the temperature in this stirred autoclave chosen by the skilled artisan, for example at 180° C. to 260° C. as indicated above.

The polymer obtained after decompression of the reactor may be isolated in a customary manner, Examples of isolation techniques include under-water pelletizing of the melt or the melt may be dissolved directly in a suitable solvent.

Modifications to this method are of course possible and can be undertaken by those skilled in the art without unreasonable effort, For example, the comonomers and the regulator can be separately metered into the reactor or the reaction temperature may be varied during the process. For instance, also a tubular reactor may be used instead of a stirred autoclave in the process described above, Polymer Composition (X)

The polymer composition (X) according to the invention comprises at least one copolymer (A) as described above and at least one organic solvent (B). The copolymers (A) should be homogeneously dispersed, preferably dissolved in the organic solvent (B). It is of course also possible to use mixtures of different organic solvents (B).

The organic solvents (B) may, for example, be nonpolar solvents comprising saturated aliphatic hydrocarbyl groups, preferably those having a flashpoint ≥60° C. Examples of such solvents comprise saturated aliphatic hydrocarbons, saturated aliphatic alcohols or esters of saturated aliphatic carboxylic acids and saturated aliphatic alcohols, preferably each having a flashpoint ≥60° C. Examples of alcohols comprise aliphatic alcohols having at least 8 carbon atoms, such as 1-octanol, 1-decanol or 1-dodecanol. Examples of esters comprise esters of saturated fatty acids having at least 8 carbon atoms with saturated aliphatic alcohols, for example methyl laurate or methyl stearate. Technical mixtures of various aliphatic esters are commercially available. In a further embodiment of the invention, it is possible to use esters of aliphatic or cycloaliphatic dicarboxylic acids, for example dialkyl esters of cyclohexane-1,2-dicarboxylic acid, such as diisononyl cyclohexane-1,2-dicarboxylate.

In a preferred embodiment of the invention, organic solvents (B) comprise hydrocarbons or a hydrocarbon mixture. These may be aliphatic, cycloaliphatic and/or aromatic hydrocarbons.

Preference is given to hydrocarbons or hydrocarbon mixtures having a flashpoint ≥60° C. The hydrocarbons may be used as a mixture of hydrocarbons with other organic solvents as outlined above. Such mixtures preferably comprise at least 50% by weight of hydrocarbons. Most preferably, only hydrocarbons or a hydrocarbon mixture are used as organic solvent (B).

The hydrocarbons may, for example, be saturated aliphatic solvents or solvent mixtures. These may be either paraffinic or naphthenic, i.e. saturated cyclic, hydrocarbons. Preference is given to high-boiling aliphatic hydrocarbons having a boiling point of at least 175° C. and preferably a flashpoint ≥60° C. Suitable hydrocarbons having a flashpoint ≥60° C. comprise, for example, n-undecane (flashpoint 60° C., boiling point 196° C.) or n-dodecane (flashpoint 71° C., boiling point 216° C.). It is possible with preference to use technical mixtures of hydrocarbons, for example mixtures of paraffinic hydrocarbons, mixtures of paraffinic and naphthenic hydrocarbons or mixtures of isoparaffins. It will be apparent to those skilled in the art that technical mixtures may still comprise small residues of aromatic or unsaturated hydrocarbons.

The hydrocarbons may also be aromatic solvents or solvent mixtures. In one embodiment of the invention, the hydrocarbons are toluene or a solvent mixture comprising toluene. In a further embodiment, the hydrocarbons are high-boiling aromatic hydrocarbons having a boiling point of at least 175° C. and preferably a flashpoint ≥60° C. It is possible with preference to use technical mixtures of aromatic hydrocarbons. Technical mixtures of aromatic solvents are commercially available, for example technical mixtures of the Shellsol® A series or the Solvesso® series.

The polymer composition (X) is prepared in the usual manner by dispersing or dissolving at least one copolymer (A) in at least one organic solvent (B). This may be done by dissolving solid copolymer (A), for instance granules of copolymer (A) in at least one organic solvent (B). In one embodiment the polymer melt obtained from polymerization may be directly dissolved in at least one organic solvent (B).

Besides the copolymer(s) (A) and the organic solvent(s) (B) the polymer composition (X) may of course comprise further components.

Examples of such further components include additives which may be used in the ready-for-use formulation such as the wax inhibitors as described below.

Specific examples of further components include poly (meth)acrylates, polymers comprising isobutene, α-olefines, for example copolymers of maleic acid anhydride and styrene, copolyrners of maleic acid anhydride and vinylacetate, which may optionally be further reacted alcohols and amines, copolymers of maleic acid anhydride and (meth) acrylates copolymers, Copolymers of fumaric acid esters and vinyl acetate, styrene-butadiene based copolymers, or alkylphenolformaldehyde resins.

The concentration of the copolymer (A) may be 5 to 35% by weight, preferably 10 to 30% by weight with respect to the sum of all components of the polymer composition (X).

Use of the Copolymers (A)

The copolymers (A) and/or the polymer compositions (X) may be used in various oilfield applications by adding them and/or suitable formulations thereof to crude oil.

Use as Pour Point Depressants

In one embodiment of the invention the copolymers (A) can be used as pour point depressants for crude oil by adding at least a copolymer (A) to the crude oil.

Pour point depressants reduce the pour point of crude oils. The pour point refers to the lowest temperature at which a sample of an oil, in the course of cooling, still just flows. For the measurement of the pour point, standardized test methods are used.

Preferably, a suitable formulation comprising at least a copolymer (A) and at least one solvent is added to the crude oil. Suitable solvents may be selected from water, polar or nonpolar organic solvents. The copolymer(s) (A) may be dissolved or dispersed in the solvent. The formulations may of course comprise further components such as for instance surfactants.

In one embodiment, the copolymers (A) can be used as pour point depressants for crude oil by adding a suitable formulation comprising at least a copolymer (A) and an organic solvent capable of dissolving the copolymer(s) (A) to the crude oil.

The skilled artisan may select suitable organic solvents according to his/her needs. Preferably, non-polar organic solvents, in particular organic solvents (B) as defined above may be used. The concentration of the copolymers (A) may also be selected by the skilled artisan an may be from 0,1 % by weight to 35% by weight of copolymers (A) in the ready-for-use formulation.

The formulation to be used may additionally comprise further components. For example, additional wax dispersants can be added to the formulation. Wax dispersants stabilize paraffin crystals which have formed and prevent them from sedimenting. The wax dispersants used may, for example, be alkylphenols, alkylphenol-formaldehyde resins or dodecylbenzenesulfonic acid.

In one preferred embodiment, the formulation comprising organic solvents comprises a composition (X). The polymer composition (X) may be used as such or further components as outlined above and/or further organic solvents, in particular further organic solvents (B) may be added before use.

The formulation to be used may be formulated at or close to the site of use, i.e. at or close to the oilfield or it may be formulated in a chemical plant distant from the site of use and then provided to the site of use. In one embodiment the site of use is an offshore platform.

In one preferred embodiment of the invention a polymer composition (X) is provided to the site of use, optionally further formulated and then used. It is the advantage of the polymer composition (X) that it is a concentrate thus minimizing transport costs but remains nevertheless liquid even at low temperatures so that it can be used without the need to melt it before use.

The inventive use is effected by adding the formulations comprising copolymer (A) and optionally comprising further components to the crude oil. The formulation should be added as long as the crude oil has a temperature greater or equal to its pour point.

The formulations are typically used in such an amount that the amount of all copolymers (A) together added is 50 to 3000 ppm based on the oil. The amount is preferably 100 to 1500 ppm, more preferably 250 to 600 ppm and, for example, 300 to 600 ppm.

In a preferred embodiment of the invention the formulation is injected into a crude oil pipeline.

The injection can preferably be effected at the oilfield, i.e. at the start of the crude oil pipeline, but the injection can of course also be effected at another site. More particularly, the pipeline may be one leading onshore from an offshore platform. Explosion protection is particularly important on offshore platforms, therefore formulations based on organic solvents having a flashpoint ≥60° C. accordingly simplify working quite considerably. Moreover, the cooling of crude oil in underwater pipelines leading onshore from an offshore platform is naturally particularly rapid, especially when the pipelines are in cold water, for example having a water temperature of less than 10° C.

In a further preferred embodiment of the invention the formulation is injected into a production well. Here too, the production well may especially be a production well leading to an offshore platform. The injection is preferably effected approximately at the site where oil from the formation flows into the production well. In this way, the solidification of the crude oil in the production well or an excessive increase in its viscosity can be prevented.

In another embodiment of the invention the copolymers (A) are used as pour point depressant and/or paraffin inhibitor for crude oil by adding emulsions and/or dispersions of at least one copolymer (A) in a suitable solvent or solvent mixture to the crude oil.

Examples of suitable solvents for such emulsions or dispersions include water, polar organic solvents miscible with water, including but not limited to alcohols such as methanol, ethanol, propanol, ethylene glycol, propylene glycol. Of course mixtures of two or more or more solvents may be used, for instance a mixture comprising water and an organic solvent miscible with water.

In a dispersion, the copolymer (A) is dispersed in a suitable solvent or solvent mixture. In an emulsion, a mixture, preferably a solution of the copolymer(s) (A) in a suitable solvent is emulsified in another solvent which is not miscible with the first solvent. As an example, the copolymer(s) (A) may be dissolved in a non-polar organic solvent and the solution is emulsified in water and/or a polar organic solvent. In one embodiment, a polymer composition (X) as described above may be emulsified in water and/or a polar organic solvent.

In addition, said emulsions and/or dispersions of at least one copolymer (A) comprise at least one emulsifier or a mixture of emulsifiers. Preferably, the amount of emulsifiers in a ready to use formulation is at least at least 10% by wt. with respect to the total of all components, for example 10-20% by weight. Examples of suitable emulsifiers comprise anionic or non-ionic surfactants including but not limited to ethoxylated fatty alcohols such as $C_{16/18}$-$(EO)_xH$ with x from 5 to 50 or synthetic ethoxylated alcohols such as $C_{13}$-$(EO)_yH$ with y from 5 to 50.

The concentration of the copolymers (A) in the emulsions or dispersions may be from 5 to 40% by wt. in a ready to use formulation.

Such emulsions and/or dispersions of at least one copolymer (A) in a suitable solvent or solvent mixture may be made by melting at least the copolymer(s) (A), the emulsifier(s) and—if present—an organic solvent in a vessel until all ingredients form a homogeneous clear melt. Under stirring, water and/or a polar organic solvent is added at 90° C. and stirring is continued until the formulation has been cooled down to room temperature.

In another embodiment such aqueous formulations may be made is by melting at least the copolymer(s) (A), at least one emulsifier and —if present —an organic solvent in a vessel until all ingredients form a homogeneous clear melt. While stirring slowly with a low shear rate, water or a polar organic solvent is added at 90° C. and stirring is continued. During the cooling process, at least one further emulsifier is added to the formulation, then it is cooled down to room temperature.

Use as Wax Inhibitors

In a further embodiment of the invention, the copolymers (A), in particular the above-detailed formulations, especially the formulations comprising polymer compositions (X) are used to prevent wax deposits on surfaces in contact with crude oil. The use is effected by adding at least one of the formulations detailed above to the crude oil. Preferred formulations have already been mentioned, and the manner of use is also analogous to the use as a pour point depressant. In addition, it is of course also possible to use further formulations which act as wax inhibitors.

It is an advantage of the copolymers (A) according to the present invention that they are suitable for use as pour point depressants and also for use as wax inhibitors. Therefore it is not necessary to mix pour point depressants and wax inhibitors if both effects are desired by the skilled artisan but using one component is sufficient.

Use as Rheology Modifiers

In a further embodiment of the invention, the copolymers (A), in particular the above-detailed formulations, especially the formulations comprising polymer compositions (X) are used as rheology modifiers in order to improve the flowing properties of crude oil, e.g. of oil flowing through pipelines to lower its viscosity thereby facilitating its transport. For this purpose the copolymers, preferably a formulation of the copolymers as detailed above may be added to the crude oil.

The following examples are intended to illustrate the invention in detail:

Part A: Manufacture of the Copolymers (A) and Comparative Copolymers

The copolymers (A) and comparative copolymers were manufactured by radical polymerization of ethylene, vinyl acetate and the respective (meth)acrylates under high pressure in a stirred high-pressure autoclave in a continuous process. Ethylene (12,0 kg/h) was pressurized to 250 bar by a pre-compressor. Vinyl acetate, the respective (meth)acrylate used and propionaldehyde as regulator were pressurized by middle pressure pumps also until 260 bar. The amounts of the comonomers and propionaldeyde are provided by table 1. The ethylene feed and the comonomer mixture were compressed together with a hypercompressor to about 1,700 bar and the mixture was fed in the autoclave. Separately, tert-amylperoxypivalate dissolved in isododecane was also pressurized with another high pressure pump to 1,700 bar and also fed into the autoclave. The temperature in autoclave was kept constantly at around 220° C. After the polymerization, the polymer is separated from the free monomers by reducing the pressure very rapidly to 1 to 20 bar. The resulting copolymer is collected as a melt in a heated product tank (200° C.), For use it may be removed and solidified.

The properties of the collected copolymers are summarized in Table 2.

TABLE 1

Feed of monomers and regulators into reactor polymerization, i-pentyl-, i-nonyl-, i-tridecyl-, and i-heptadecyl moieties are branched alkyl groups.

| No. | vinyl acetate [l/h] | (meth)acrylate type | [l/h] | propion- aldehyde [ml/h] | Yield % |
|---|---|---|---|---|---|
| C1 | 6.5 | — | — | — | 20 |
| C2 | 7.2 | — | — | — | 20 |
| C3 | 6.33 | — | — | 102 | 21 |
| C4 | 5.4 | 2-propylheptyl acrylate | 0.9 | 910 | 21 |
| C5 | 7.5 | 2-propylheptyl acrylate | 1.5 | 0 | 20 |
| C6 | 2.57 | methyl acrylate | 0.42 | 27 | 20 |
| C7 | 5.13 | n-octyl acrylate | 0.27 | 50 | 20 |
| C8 | 4.67 | n-dodecyl acrylate | 1.3 | 67 | 25 |
| C9 | 5.21 | n-dodecyl acrylate | 0.125 | 0 | 19 |
| C10 | 5.2 | n-dodecyl methacrylate | 0.135 | 0 | 18 |
| C11 | 4.12 | n-dodecyl methacrylate | 0.46 | 74 | 25 |
| C12 | 3.1 | n-octadecyl acrylate | 0.2 | 0 | 20 |
| C13 | 3.2 | n-docosyl acrylate | 0.2 | 0 | 21 |

TABLE 1-continued

Feed of monomers and regulators into reactor polymerization,
i-pentyl-, i-nonyl-, i-tridecyl-, and i-heptadecyl moieties
are branched alkyl groups.

| No. | vinyl acetate [l/h] | (meth)acrylate type | [l/h] | propion-aldehyde [ml/h] | Yield % |
|---|---|---|---|---|---|
| 1 | 5.1 | 2-propylheptyl acrylate | 0.34 | 0 | 21 |
| 2 | 4.9 | 2-propylheptyl acrylate | 0.30 | 0 | 24 |
| 3 | 4.45 | 2-propylheptyl acrylate | 1.15 | 82 | 21 |
| 4 | 4.54 | cyclohexyl methacrylate | 0.26 | 39 | 20 |
| 5 | 5.52 | cyclohexyl methacrylate | 0.45 | 0 | 24 |
| 6 | 4.41 | cyclohexyl acrylate | 0.72 | 98 | 21 |
| 7 | 5.13 | 2-ethylhexyl acrylate | 0.27 | 43 | 22 |
| 8 | 3.38 | 2-ethylhexyl acrylate | 0.91 | 105 | 21 |
| 9 | 5.1 | i-pentyl acrylate | 0.25 | 0 | 20 |
| 10 | 4.4 | i-nonyl acrylate | 1.2 | 0 | 21 |
| 11 | 4.6 | i-tridecyl acrylate | 1.3 | 0 | 21 |
| 12 | 3.2 | i-heptadecyl acrylate | 0.2 | 0 | 23 |

Solutions of the other copolymers (A) and solutions of comparative copolymers were obtained in similar manner.

Part B: Test of the Properties of the Polymers Obtained
Molecular Weight Determination The number-average molecular weight $M_n$ and the weight-average molecular weight $M_w$ of each of the copolymers obtained were determined by means of gel permeation chromatography in tetrahydrofuran as the solvent using polystyrene standards. The values are compiled in table 2 and 3.

Determination of Viscosity in Aromatic Solvent

The viscosity of solutions of 10% by wt. of the copolymers (A) and comparative polymers in Solvesso® 150 were measured at 25° C. using a Brookfield DV 111+ Rheometer using a constant shear rate and spindle #21. The results are summarized in table 3.

Determination of the Pour Point

The determination of the pour point was conducted to ASTM D97 "Standard Test Method for Pour Point of Petroleum Products. The pour point is the minimum tem-

TABLE 2

Composition of the copolymers synthesized, comparative examples

| No. | Ethylene | vinyl acetate | 2-propyl heptyl acrylate | methyl acrylate | n-octyl acrylate | n-dodecyl acrylate | n-dodecyl meth-acrylate | n-octadecyl acrylate | n-docosyl acrylate | Mw [g/mol] | $M_n$ [g/mol] | $M_w/M_n$ |
|---|---|---|---|---|---|---|---|---|---|---|---|---|
| C1 | 88.8 | 11.2 | — | — | — | — | — | — | — | 45700 | 8380 | 5.5 |
| C2 | 86.2 | 13.8 | — | — | — | — | — | — | — | 118000 | 20300 | 5.8 |
| C3 | 89.4 | 10.4 | — | — | — | — | — | — | — | 35000 | 6500 | 5.4 |
| C4 | 86.2 | 10.5 | 3.3 | — | — | — | — | — | — | 7300 | 3000 | 2.4 |
| C5 | 80 | 14 | 6 | — | — | — | — | — | — | 41000 | 8200 | 5.0 |
| C6 | 90.5 | 4.8 | — | 4.6 | — | — | — | — | — | 75000 | 9000 | 8.3 |
| C7 | 91.4 | 7.4 | — | — | 1 | — | — | — | — | 45000 | 8500 | 5.3 |
| C8 | 89.1 | 7.3 | — | — | — | 3.4 | — | — | — | 49600 | 7710 | 6.4 |
| C9 | 88.9 | 10.4 | — | — | — | 0.5 | — | — | — | 81400 | 9780 | 8.3 |
| C10 | 88.9 | 10.3 | — | — | — | — | 0.5 | — | — | 102400 | 17120 | 6.0 |
| C11 | 92.2 | 6.4 | — | — | — | — | 1.3 | — | — | 38000 | 5900 | 6.4 |
| C12 | 90 | 9.4 | — | — | — | — | — | 0.3 | — | 76000 | 9030 | 8.4 |
| C13 | 89.6 | 9.5 | — | — | — | — | — | — | 0.6 | 75600 | 9040 | 8.4 |

Composition of the copolymers synthesized, examples according to invention

| No. | Ethylene | Vinyl acetate | 2-propyl heptyl acrylate | cyclo hexyl methacrylate | cyclo hexyl acrylate | 2-ethyl hexyl acrylate | i-pentyl acrylate | i-nonyl acrylate | i-tridecyl acrylate | i-heptadecyl acrylate | Mw [g/mol] | $M_n$ [g/mol] | $M_w/M_n$ |
|---|---|---|---|---|---|---|---|---|---|---|---|---|---|
| 1 | 89.1 | 9.4 | 1.3 | — | — | — | — | — | — | — | 73000 | 10500 | 7.0 |
| 2 | 90 | 9 | 1 | — | — | — | — | — | — | — | 66700 | 21200 | 3.1 |
| 3 | 89.8 | 6.9 | 3.2 | — | — | — | — | — | — | — | 48600 | 7390 | 6.6 |
| 4 | 90.6 | 7.4 | — | 1.8 | — | — | — | — | — | — | 34700 | 5880 | 5.9 |
| 5 | 88.1 | 8.7 | — | 2.9 | — | — | — | — | — | — | 66700 | 7860 | 8.5 |
| 6 | 90.2 | 7.4 | — | — | 2.3 | — | — | — | — | — | 38800 | 6820 | 5.7 |
| 7 | 91.5 | 7.3 | — | — | — | 1 | — | — | — | — | 54900 | 7460 | 7.4 |
| 8 | 91.6 | 4.7 | — | — | — | 3.6 | — | — | — | — | 39000 | 6660 | 5.9 |
| 9 | 91.5 | 7.2 | — | — | — | — | 1.1 | — | — | — | 75000 | 9035 | 8.3 |
| 10 | 90.5 | 6.3 | — | — | — | — | — | 3.2 | — | — | 65000 | 10430 | 6.2 |
| 11 | 89.2 | 7.4 | — | — | — | — | — | — | 3.3 | — | 50000 | 8200 | 6.1 |
| 12 | 90 | 9.4 | — | — | — | — | — | — | — | 0.3 | 76900 | 9520 | 8.1 |

Manufacture of Polymer Compositions (X)

100 kg of granulates of copolymer (A) No. 2 are dissolved in 900 kg Solvesso® 150 (a high-boiling aromatic hydrocarbon mixture from ExxonMobil Chemical Company, aromatics content >99% by vol., initial boiling point 184° C., flashpoint to ASTM D93 >61° C.) in a vessel (1,5 m³). The mixture is heated at 80° C. and stirred with 60 rpm for 4 hours.

After 4 hours the solution is completely homogenous dissolved. Polymer content: 9.8% by wt.

Viscosity of the solution at 25° C.: 57 mPas (see table 3).

perature at which a sample of the oil used for the tests is still just free-flowing. According ASTM D97, for this purpose, a sample of the oil is cooled in steps of 3° C. each and the flowability is tested after each step. For the tests, a crude oil from the "Landau" oilfield in south-west Germany (Wintershall Holding GmbH) having an API gravity of 37 and a pour point of 27° C. was used. To determine the lowering of the pour point, the graft copolymers to be tested were used to the oil in a concentration of 100 ppm, 300 ppm or 1500 ppm, in each case of polymer based on the crude oil. The values are compiled in table 1. Double or triple determinations were conducted on some samples. In these cases, all measurements are reported in the table. The results are summarized in table 3.

Determination of Viscosity of Crude Oil

For the tests, a crude oil from the "Landau" oilfield in south-west Germany (Wintershall Holding GmbH) having an API gravity of 37 and a pour point of 27° C. was used. The viscosity in crude oil was measured by a HAAKE RheoStress 6000 rheometer for each sample using a sample adapter of cone and plate. The shear rate is constant.

The viscosity of the crude oil at 9° C. is 2500 mPas. Furthermore, the viscosity of crude oil comprising 100 ppm of the copolymers C1 to C13 and 1 to 12 (added as 10% solution in xylene) and the viscosity of crude oil comprising 300 ppm of copolymers C1 to C13 and 1 to 12 were measured respectively under the same conditions in order to study the influence of the copolymers on the rheological properties of the oil. The results are summarized in table 3.

Wax Inhibition

The cold finger deposition test was utilized to determine the wax inhibition properties of the terpolymers. The wax inhibition was determined by exposing the crude oil to a cold metal finger surface in the presence and absence of the inhibitor. The amount and type of wax deposited on the cold metal finger was used to determine waxing tendency.

For the tests, a crude oil from the "Landau" oilfield in south-west Germany (Wintershall Holding GmbH) having an API gravity of 37 and a pour point of 27° C. was used. The test was started by conditioning the oil sample by heating to 80° C. and holding for 30 minutes to remove thermal history. A water bath on the cold finger apparatus was adjusted so that the oil temperature is maintained at 35° C. The cold finger was maintained at 4° C. and the cold finger was inserted into oil sample. The test was run for 4 hours. The cold finger was removed the wax deposit was removed with a paper towel. The wax deposit was weighed. The wax test was repeated in the presence and absence of the copolymers C1 to C13 and 1 to 12. The amount of copolymers used was 1000 ppm (added as solution of 10% copolymer in xylene) with respect to crude oil. The percent efficacy was calculated on the performance of paraffin inhibitor as compared to the baseline (i.e. the measurement without wax inhibitor The results are summarized in table 3.

TABLE 3

Summary of results, *the viscosity of crude oil without additives is 2500 mPas

| No. | Polymer composition [mol %] | | | | Viscosity in solution [mPas] | $M_w$ [g/mol] | Pour Point [° C.] amount of polymer [ppm] | | | viscosity in crude oil at 9° C.* [mPas] amount of polymer [ppm] | | Cold finger test wax deposition [g] | Wax inhibition [%] |
|---|---|---|---|---|---|---|---|---|---|---|---|---|---|
| | E | Vac | (meth)acrylaye type | amount | | | 100 | 300 | 1500 | 100 | 300 | | |
| C1 | 88.8 | 11.2 | — | — | 79.5 | 45700 | 14 | 7.5 | 11 | 2000 | 1800 | 4.01 | 58 |
| C2 | 86.2 | 13.8 | — | — | 102 | 118000 | 12 | 9 | 9 | 2100 | 1500 | 3.8 | 60 |
| C3 | 89.4 | 10.4 | — | — | 20 | 35000 | 18 | 18 | 12 | 2500 | 2334 | 3.5 | 58 |
| C4 | 86.2 | 10.5 | C10, branched | 3.3 | 3 | 7300 | 27 | 26 | 19 | 2238 | 2679 | 7.9 | 18 |
| C5 | 80 | 14 | C10, branched | 6 | 35 | 41000 | 25 | 24 | 23 | 2200 | 2100 | 3.5 | 58 |
| C6 | 90.5 | 4.8 | C1 | 4.6 | 45 | 75000 | 17 | 16 | 12 | 2233 | 1356 | 4.7 | 51 |
| C7 | 91.4 | 7.4 | C8, linear | 1 | 50 | 45000 | 18 | 18 | 12 | 2450 | 1500 | 4 | 57 |
| C8 | 89.1 | 7.3 | C12, linear | 3.4 | 20 | 49600 | 21 | 18 | 18 | 2499 | 1690 | 6 | 37 |
| C9 | 88.9 | 10.4 | C12, linear | 0.5 | 50 | 81400 | 9 | 9 | 9 | 2139 | 1522 | 2.57 | 73 |
| C10 | 88.9 | 10.3 | C12, linear | 0.5 | 130 | 102400 | 9 | 9 | 9 | 2400 | 1538 | 2.73 | 72 |
| C11 | 92.2 | 6.4 | C12, linear | 1.3 | 270 | 38000 | 15 | 13.5 | 13.5 | 2500 | 1010 | 3.8 | 60 |
| C12 | 90 | 9.4 | C18, linear | 0.3 | 75 | 76000 | 12 | 9 | 9 | 2300 | 1300 | 3.5 | 62 |
| C13 | 89.6 | 9.5 | C22, linear | 0.6 | 80 | 75600 | 12 | 9 | 9 | 2350 | 1710 | 3.6 | 57 |
| 1 | 89.1 | 9.4 | C10, branched | 1.3 | 55 | 73000 | 9 | 9 | 6 | 1798 | 1346 | 1.88 | 80 |
| 2 | 90 | 9 | C10, branched | 1 | 57 | 66700 | 9 | 9 | 6 | 1500 | 1200 | 1.89 | 78 |
| 3 | 89.8 | 6.9 | C10, branched | 3.2 | 20 | 48600 | 18 | 12 | 12 | 1800 | 1805 | 1.87 | 80 |
| 4 | 90.6 | 7.4 | C6, cyclic | 1.8 | 40 | 34700 | 18 | 15 | 12 | 1992 | 1555 | 1.56 | 84 |
| 5 | 88.1 | 8.7 | C6, cyclic | 2.9 | 20 | 66700 | 17.5 | 12 | 9 | 1455 | 1448 | 1.23 | 87 |
| 6 | 90.2 | 7.4 | C6, cyclic | 2.3 | 17 | 38800 | 19.5 | 16.5 | 15 | 1850 | 1259 | 1.36 | 86 |
| 7 | 91.5 | 7.3 | C8, branched | 1 | 50 | 54900 | 16.5 | 15 | 13.5 | 1768 | 838 | 1.86 | 81 |
| 8 | 91.6 | 4.7 | C8, branched | 3.6 | 45 | 39000 | 18 | 12 | 12 | 1582 | 1475 | 2.01 | 80 |
| 9 | 91.5 | 7.2 | C5, branched | 1.1 | 43 | 75000 | 15 | 12 | 9 | 1553 | 1200 | 2.7 | 72 |
| 10 | 90.5 | 6.3 | C9, branched | 3.2 | 25 | 65000 | 16 | 12 | 9 | 1420 | 1150 | 2.5 | 73 |
| 11 | 89.2 | 7.4 | C13, branched | 3.3 | 30 | 50000 | 17 | 12 | 9 | 1512 | 1300 | 2.5 | 74 |
| 12 | 90 | 9.4 | C17, branched | 0.3 | 40 | 76900 | 12 | 12 | 9 | 1581 | 1567 | 2.3 | 77 |

Comments on the Results Obtained:

The present application relates to copolymers comprising ethylene, vinylesters and and certain (meth)acrylic acid esters which are specifically adapted for use in oilfield applications, in particular as pour point depressants, wax inhibitors, and rheology modifiers. Although similar (but not the same) copolymers are known for use in fuel oil applications our examples demonstrate that certain conditions need to be fulfilled in order to provide satisfying results in oilfield applications.

All copolymers (A) according to the invention show a wax inhibition of more than 70%, including examples 1 to 8 which show a wax inhibition of at least 80%. Only two of the comparative examples have a wax inhibition of 72%, resp. 73% while all the other comparative examples show a wax inhibition of not more than 62%, in the worst case only 18%.

In a similar manner, none of the comparative polymers added at a concentration of 100 ppm to crude oil diminishes the viscosity of said crude oil at 9° C. (2500 mPas) to numbers of less than 2000 mPas while all inventive copolymers yield less than 1850 mPas. The copolymer comprising 2-propylheptylacrylate (examples 1, 2, and 3) shows the best performance as pour point depressant.

A comparison of examples 1 and 2 with example 3 and with comparative example 4 shows the importance of a sufficient molecular weight. Comparative example 1 also comprises 2-propylheptylacrylate but has a molecular weight $M_w$ of only 7,300 g/mol (which is well below the lower limit of 35,000 g/mol as required by our invention). Its performance as pour point depressant, wax inhibitor, and rheology modifier is the worst of all examples but also comparative examples. The best examples 1 and 2 have a molecular weight $M_w$ of 73,000 g/mol and 66,700 g/mol respectively. Example 3 which also comprises 2-propylheptylacrylate has a somewhat lower molecular weight of 48,600 g/mol. While its performance as wax inhibitior and rheology modifier still is very satisfying, its performance is no longer that good as that of examples 1 and 2.

Comparative example 4 demonstrates the need of a sufficient amount of ethylene. The polymer comprises only 80 mol % ethylene (which is below the lower limit of 84 mol % ethylene required by our invention) and its performance as pour point depressant is as worse as that of comparative example 1.

Comparative example C7 shows that linear alkyl moieties are inferior as compared to the branched of cyclic alkyl moieties of the present invention. The copolymer C7 comprises 1% of n-octyl acrylate while the copolymer 7 comprises 1% of 2-ethylhexyl acrylate. While the performance as pour point depressant is in about the same for both polymers, C7 added at a concentration of 100 ppm does nearly not reduce the oil viscosity at all, while copolymer 7 already significantly reduces it. Also at a concentration of 300 ppm the performance of copolymer is far better than that of C7. Furthermore, copolymer C7 has not a good performance as wax inhibitor (57%), while polymer 7 has an excellent performance (81%).

Similar observations may be made by comparing a linear $C_{12}$ acrylate (copolymer C8) with a branched $C_{13}$ acrylate (copolymer 11). Copolymer 11 shows a better performance as pour point depressant but also as wax inhibitor and rheology modifier.

It is the advantage of the copolymers (A) according to the invention that they not only act as pour point depressants for crude oil but simultaneously as wax inhibitors and rheology.

The invention claimed is:

1. A method comprising adding a pour point depressant for crude oil comprising a copolymer (A) to the crude oil; wherein the copolymer (A) comprises
   (M1) 83.5 mol % to 96.5 mol % of ethylene,
   (M2) 3 mol % to 11.5 mol % of at least one vinyl ester of the formula $H_2C=CH-O-(O)C-R^1$ (I) where $R^1$ is H or a $C_1$- to $C_4$ alkyl moiety, and
   M3) 0.5 mol % to 5 mol % of a (meth)acrylate of the formula $H_2C=C(R^2)-COOR^3$ wherein $R^2$ is H or methyl, and $R^3$ is selected from the group consisting of
   $R^{3a}$: branched alkyl moieties having 4 to 18 carbon atoms,
   $R^{3b}$: cyclic alkyl moieties having 5 to 12 carbon atoms, and
   $R^{3c}$: aryl moieties having 6 to 12 carbon atoms which are optionally alkyl substituted,
   and wherein the copolymer (A) has a weight average molecular weight $M_w$ of 35,000 g/mol to 150,000 g/mol.

2. The method according to claim 1, wherein $R^1$ is a methyl moiety.

3. The method according to claim 1, wherein $R^{3a}$ has 5 to 11 carbon atoms.

4. The method according to claim 1, wherein $R^{3a}$ has 8 to 10 carbon atoms.

5. The method according to claim 1, wherein $R^{3b}$ has 6 to 10 carbon atoms.

6. The method according to claim 1, wherein $R^3$ is selected from the group consisting of $R^{3a}$ and $R^{3b}$.

7. The method according to claim 1, wherein $R^3$ is $R^{3a}$.

8. The method according to claim 1, wherein the weight average molecular weight $M_w$ of the copolymer (A) is 50,000 g/mol to 120,000 g/mol.

9. The method according to claim 1, wherein an emulsion or dispersion of at least one copolymer (A) in a solvent or solvent mixture to the crude oil.

10. A method comprising adding a formulation comprising at least one copolymer (A) and an organic solvent to crude oil; wherein the copolymer (A) comprises
    (M1) 83.5 mol % to 96.5 mol % of ethylene,
    (M2) 3 mol % to 11.5 mol % of at least one vinyl ester of the formula $H_2C=CH-O-(O)C-R^1$ (I) where $R^1$ is H or a $C_1$- to $C_4$ alkyl moiety, and
    (M3) 0.5 mol % to 5 mol % of a (meth)acrylate of the formula $H_2C=C(R^2)-COOR^3$ wherein $R^2$ is H or methyl, and $R^3$ is selected from the group consisting of
    $R^{3a}$: branched alkyl moieties having 4 to 18 carbon atoms,
    $R^{3b}$: cyclic alkyl moieties having 5 to 12 carbon atoms, and
    $R^{3c}$: aryl moieties having 6 to 12 carbon atoms which are optionally alkyl substituted,
    and wherein the copolymer (A) has a weight average molecular weight $M_w$ of 35,000 g/mol to 150,000 g/mol.

11. The method according to claim 10, wherein the formulation comprises a composition (X) comprising
    the at least one copolymer (A), and
    the at least one organic solvent (B),
    wherein the concentration of the copolymer (A) is 5 to 25% by weight with respect to the sum of all components of the composition (X).

12. The method according to claim 10, wherein the formulation used additionally comprises at least one wax dispersant.

13. The method according to claim 12, wherein the wax dispersant is at least one selected from the group consisting of alkylphenols, alkylphenol-formaldehyde resins, and dodecylbenzenesulfonic acid.

14. The method according to claim 11, wherein the organic solvent (B) comprises a hydrocarbon or a hydrocarbon mixture.

15. The method according to claim 11, wherein the solvent (B) comprises saturated aliphatic hydrocarbons having a flashpoint≥60° C.

16. The method according to claim 11, wherein the concentration of the copolymer (A) is 10 to 20% by weight.

17. The method according to claim 10, wherein the amount of copolymer (A) added is 50 to 3000 ppm of the copolymer (A) based on the crude oil.

18. The method according to claim 10, wherein the formulation is injected into a crude oil pipeline.

19. The method according to claim 10, wherein the formulation is injected into a production well.

20. A method comprising adding a rheology modifier comprising at least one formulation comprising a copolymer (A) and an inorganic solvent to crude oil; wherein the copolymer (A) comprises
    (M1) 83.5 mol % to 96.5 mol % of ethylene, (M2) 3 mol % to 11.5 mol % of at least one vinyl ester of the formula $H_2C=CH-O-(O)C-R^1$ (I) where $R^1$ is H or a $C_1$- to $C_4$ alkyl moiety, and (M3) 0.5 mol % to 5 mol % of a (meth)acrylate of the formula $H_2C=C(R^2)-COOR^3$ wherein $R^2$ is H or methyl, and $R^3$ is selected from the group consisting of $R^{3a}$: branched alkyl moieties having 4 to 18 carbon atoms, $R^{3b}$: cyclic alkyl moieties having 5 to 12 carbon atoms, and $R^{3c}$: aryl moieties having 6 to 12 carbon atoms which are optionally alkyl substituted , and wherein the copolymer (A) has a weight average molecular weight $M_w$ of 35,000 g/mol to 150,000 g/mol.

21. The method according to claim 20, wherein the formulation comprises a composition (X) comprising the at least one copolymer (A), and the at least one organic solvent (B), wherein the concentration of the copolymer (A) is 5 to 25% by weight with respect to the sum of all components of the composition (X).

\* \* \* \* \*